Sept. 15, 1931.  A. GAUDENZI  1,823,684
RECTIFYING SYSTEM
Filed Dec. 6, 1928

Inventor
Arthur Gaudenzi
By Alfred H. Dyson
Attorney

Patented Sept. 15, 1931

1,823,684

UNITED STATES PATENT OFFICE

ARTHUR GAUDENZI, OF BADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

RECTIFYING SYSTEM

Application filed December 6, 1928, Serial No. 324,180, and in Germany December 10, 1927.

This invention relates to improvements in electric current rectifying systems of the metallic vapor type, and particularly to means for preventing disturbances in the operation of such rectifiers by over-voltages of higher frequencies in the circuit supplying such rectifiers.

Over-voltages of high frequency commonly occur, in metallic vapor electric current rectifying systems, which cause disturbances in the operation of the rectifier and the transformer supplying the same, by causing damage to the electrodes of the rectifier and to the transformer windings. Research has shown that such over-voltages are caused by the natural oscillation of the system supplying the transformer and are augmented in normal rectifier operation. Each system has a natural capacity and, therefore, provides a natural oscillation period to which the system responds. This characteristic of electric systems may be neutralized if the frequency is varied within the known limits, by use of an additional capacity or a self-induction. If the frequency of the natural oscillations of the systems is equal to or less than the operating frequency of the rectifier, the over-voltage can be altogether neutralized. For practical reasons, however, such neutralization is impossible because of the large additional capacity or additional self-induction which are required.

It is, therefore, among the objects of the present invention to provide means for neutralizing the effect of over-voltages occurring in systems supplying metallic vapor electric current rectifiers.

Another object of the invention is to provide means for neutralizing the effect of over-voltages occurring in metallic vapor rectifier current supplying systems without the use of large additional capacities.

Another object of the invention, is to provide means for neutralizing the effect of over-voltages occurring in rectifier supplying circuits without the use of large additional inductances.

Another object of the invention is to provide means for blocking the path of over-voltages in rectifier circuits whereby such over-voltages are rendered ineffective to disturb the rectifier operation.

Another object of the invention is to provide auxiliary circuits oscillating at the frequency of the secondary of the transformer which supplies a metallic vapor rectifier.

Figure 1:
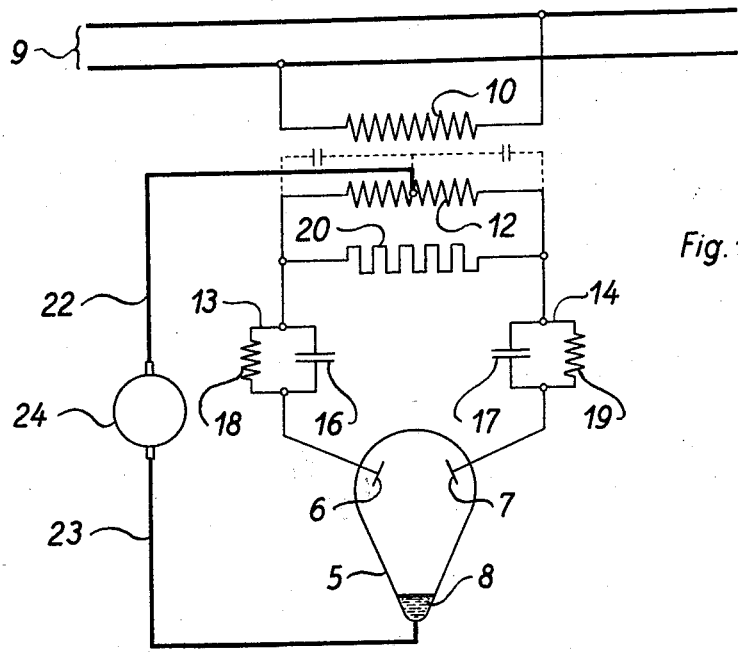
Figure 2:
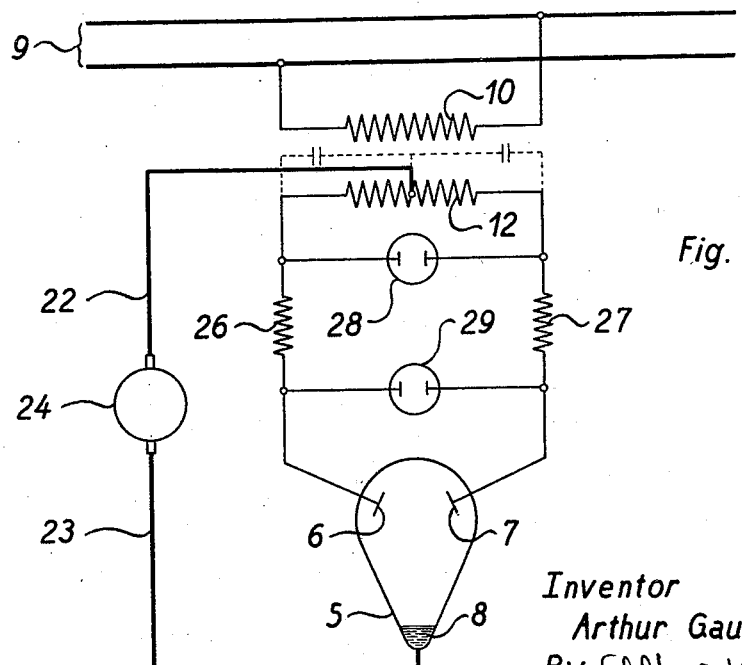

Other objects and advantages will hereinafter appear in which, for the purpose of illustrating the invention, several embodiments thereof are shown in the drawings; wherein Figure 1 is a diagrammatic view showing a rectifying system embodying the present improvements; and Fig. 2 is a diagrammatic similar view, illustrating a modification.

Referring more particularly to Fig. 1, 5 indicates a metallic vapor rectifier of any well-known type having anodes 6 and 7 and a mercury cathode 8. The rectifier is supplied with electric current from the alternating current system 9 through a transformer having the primary 10 and secondary 12. The secondary 12 of the transformer is connected to the anodes 6 and 7 through oscillation circuits 13 and 14 comprising condensers 16 and 17 and inductive reactances 18 and 19, connected as shown. A resistance 20 is connected across the transformer secondary 12 between the terminals thereof and of the oscillation circuits 13 and 14. The direct current lines 22 are shown leading from the transformer and the cathode to a load 24.

Each side of the transformer secondary 12, from the mid-point to the terminal, has a natural oscillation frequency which comes into being upon operation of the rectifier.

The higher voltage frequencies are neutralized by a resistance 20, while any unneutralized portion thereof is prevented from affecting the rectifier anodes 6 and 7 by the oscillation circuits 13 and 14 which are tuned to the frequency of the higher voltages occurring in the corresponding portions of the transformer secondary.

In the embodiment shown in Fig. 2, wherein like parts are designated by the same reference numerals as in Fig. 1, reactance coils 26 and 27 are arranged in the connections between the terminals of the transformer secondary 12 and the anodes 6 and 7. A glow tube 28 of the usual construction is connected in parallel relation with the secondary 12 immediately ahead of coils 26 and 27, and a similar glow tube 29 is connected in a similar manner immediately ahead of the anodes 6 and 7, as shown.

With this arrangement, any voltage of higher frequency occurring in the secondary 12 is partially neutralized by the inductive reactances 26 and 27, while the remainder of such voltages of higher frequency is neutralized by the tubes 28 and 29.

Any oscillations, whether produced in the source of alternating current supply 9, or in the transformer connecting the rectifier with such source of supply, will be prevented from influencing the normal operation of the rectifier by the neutralizing action of the resistance 20 and the oscillation circuits 13 and 14 in Fig. 1 or the reactances 26 and 27 and the glow tubes 28 and 29 in Fig. 2.

While but two embodiments of the present invention have been illustrated and described, it will be understood that various other embodiments are possible, and that various changes may be made in the connections illustrated and described herein without departing from the spirit of the invention or the scope of the claims.

Claims:

1. In a current-rectifying system, current-rectifying apparatus having anodes, an alternating voltage supply source for said apparatus, said supply voltage having an over-voltage of high frequency impressed thereon, transformer means having a secondary and providing an operating connection between said source and said apparatus, an oscillation circuit interposed between each terminal of said secondary and each anode and tuned to the frequency of said over-voltage, and a resistance connected in parallel relation with said secondary for equalizing said over-voltage prevented by said resonant circuits from being impressed on the anodes.

2. In a current-rectifying system, current-rectifying apparatus having anodes, an alternating voltage supply source for said apparatus, said supply voltage having an over-voltage of high frequency impressed thereon, a transformer having a secondary winding and providing an operating connection between said source and said apparatus, an inductive reactance connected in series with said secondary and said apparatus, and a condenser connected in parallel with said reactance, said reactance and said condenser forming an oscillating circuit tuned to the frequency of said over-voltage for preventing the disturbance of normal operation of said apparatus by said over-voltage, and a resistance in parallel with said secondary for equalizing said over-voltage.

3. In a current-rectifying system, current-rectifying apparatus having anodes, an alternating voltage supply source for said apparatus, said supply voltage having an over-voltage of high frequency impressed thereon a transformer having a secondary winding, and providing an operating connection between said source and said apparatus, inductive reactances connected in series with the respective secondary terminals and said anodes, condensers connected respectively in parallel with said reactances, said reactances being so proportioned that the normal voltage supplied by said secondary to said anodes is only slightly affected and that said over-voltage is substantially prevented from being impressed on said anodes, and a resistance in parallel with said secondary for equalizing said over-voltage.

In testimony whereof I have hereunto subscribed my name this 15th day of November A. D. 1928.

ARTHUR GAUDENZI.